United States Patent [19]
Cheung

[11] Patent Number: 5,397,214
[45] Date of Patent: Mar. 14, 1995

[54] APPARATUS FOR HANDLING THIN, FLEXIBLE SHEETS OF MATERIAL

[76] Inventor: Yau T. Cheung, 2348 S. Canal, Chicago, Ill. 60616

[21] Appl. No.: 74,590

[22] Filed: Jun. 11, 1993

[51] Int. Cl.$^6$ .............................................. B65H 1/16
[52] U.S. Cl. ........................ 414/796.7; 187/274; 187/275; 271/155; 414/924; 414/926
[58] Field of Search .............. 187/17, 29.2; 271/6, 271/12, 95, 103, 155; 414/793.1, 796.7, 924, 926

[56] References Cited

U.S. PATENT DOCUMENTS

| | | | |
|---|---|---|---|
| 3,202,302 | 8/1965 | Insolio | 414/793.1 |
| 3,485,393 | 12/1969 | Wilder | 271/103 X |
| 3,598,397 | 8/1971 | Preisig | 271/95 X |
| 3,880,297 | 4/1975 | Martin | 414/926 X |
| 4,180,258 | 12/1979 | Wildförster | 414/793.1 X |
| 4,382,739 | 5/1983 | Mack et al. | 187/17 X |
| 4,442,657 | 4/1984 | Busseniers et al. | 414/793.1 X |
| 4,913,043 | 4/1990 | Cheung | 99/450.6 |
| 5,039,295 | 8/1991 | Cheung | 425/241 |
| 5,161,458 | 11/1992 | Cheung | 99/450.6 |

FOREIGN PATENT DOCUMENTS 1222363 4/1986 U.S.S.R. ...................... 414/796.7

Primary Examiner—Michael S. Huppert
Assistant Examiner—Janice L. Krizek
Attorney, Agent, or Firm—Dorn, McEachran, Jambor & Keating

[57] ABSTRACT

An apparatus for mechanically removing a thin sheet of material, such as food dough, from a stack of such sheets and depositing the sheet on a moving conveyor in a desired orientation so that a food filling may be automatically placed on the sheet of material. The apparatus picks up the thin sheet with suction nozzles, carries the thin sheet to the conveyor where pressurized air is delivered to the nozzles to release the thin sheet from the suction nozzles. A combined hydraulic-pneumatic lifting mechanism is provided to incrementally lift the stack of thin sheets to the pick-off apparatus.

2 Claims, 4 Drawing Sheets

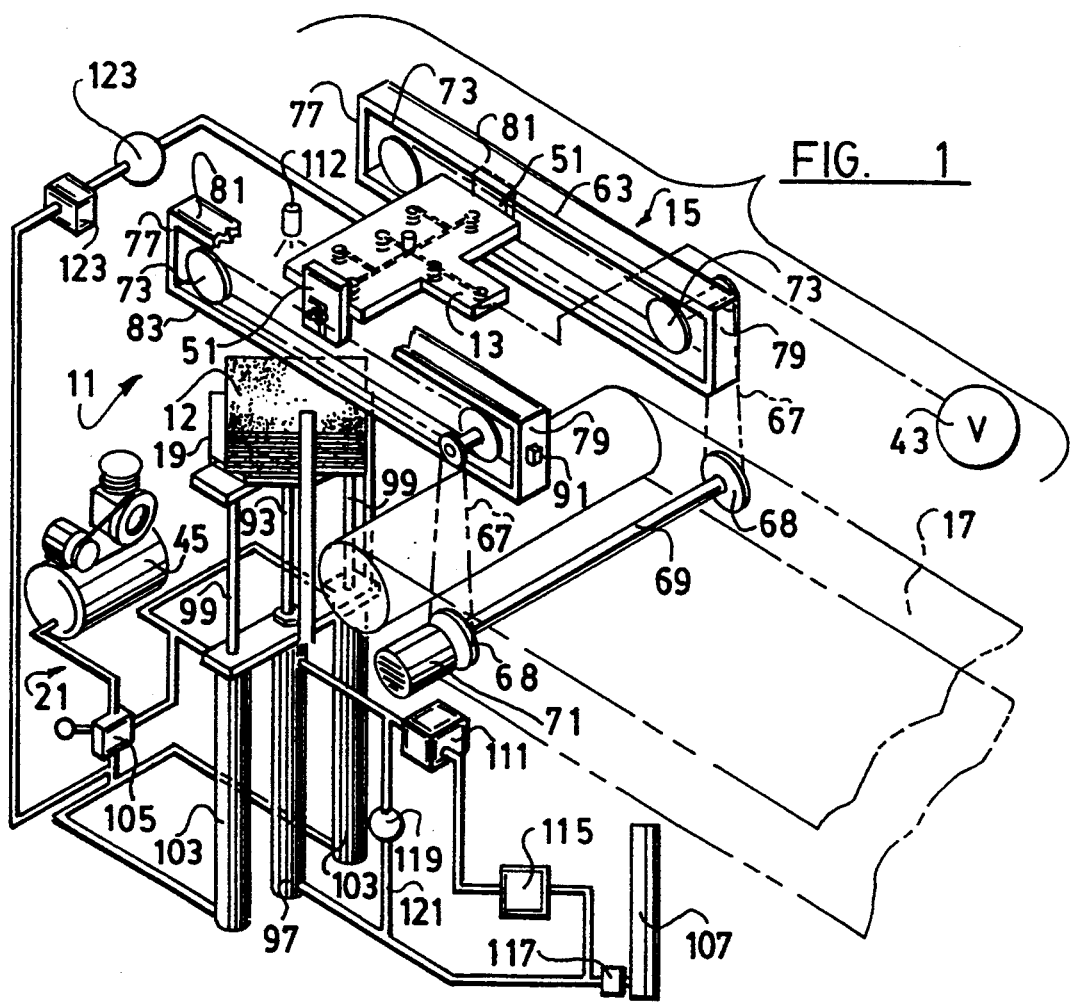
FIG. 1
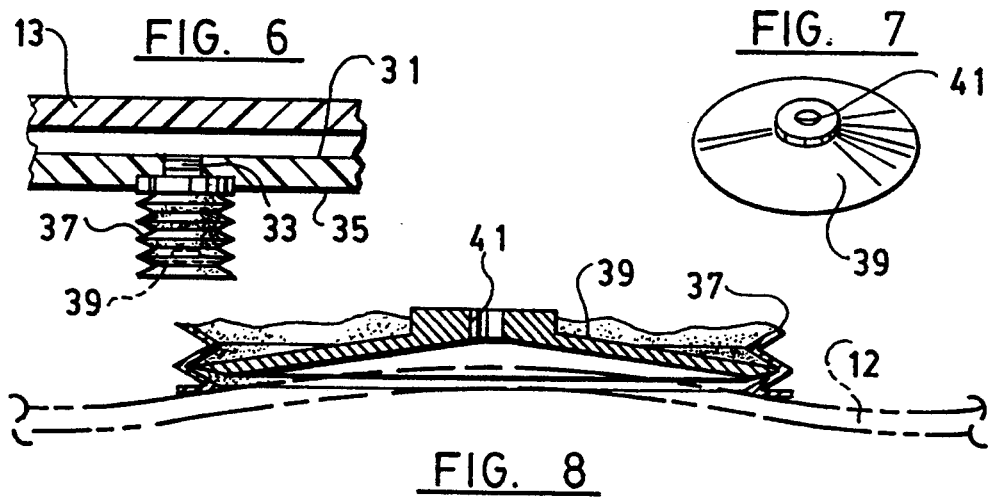
FIG. 6
FIG. 7
FIG. 8

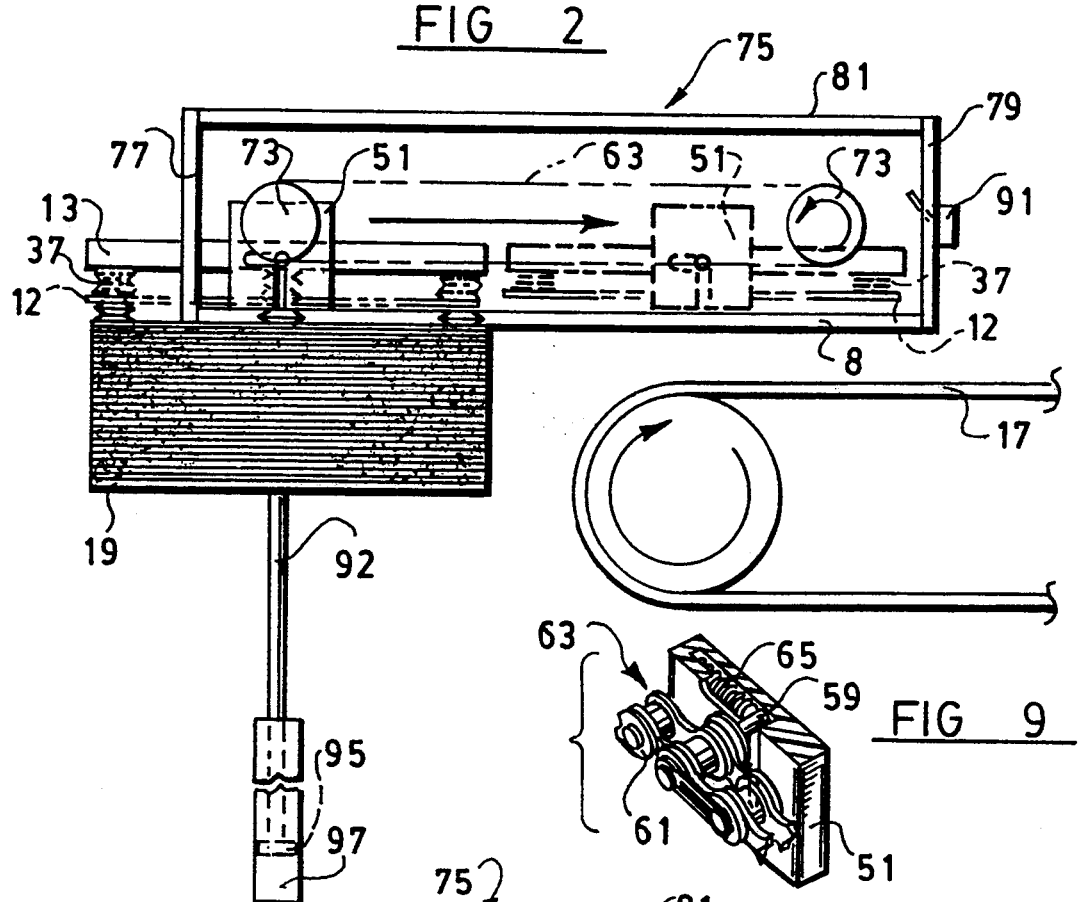
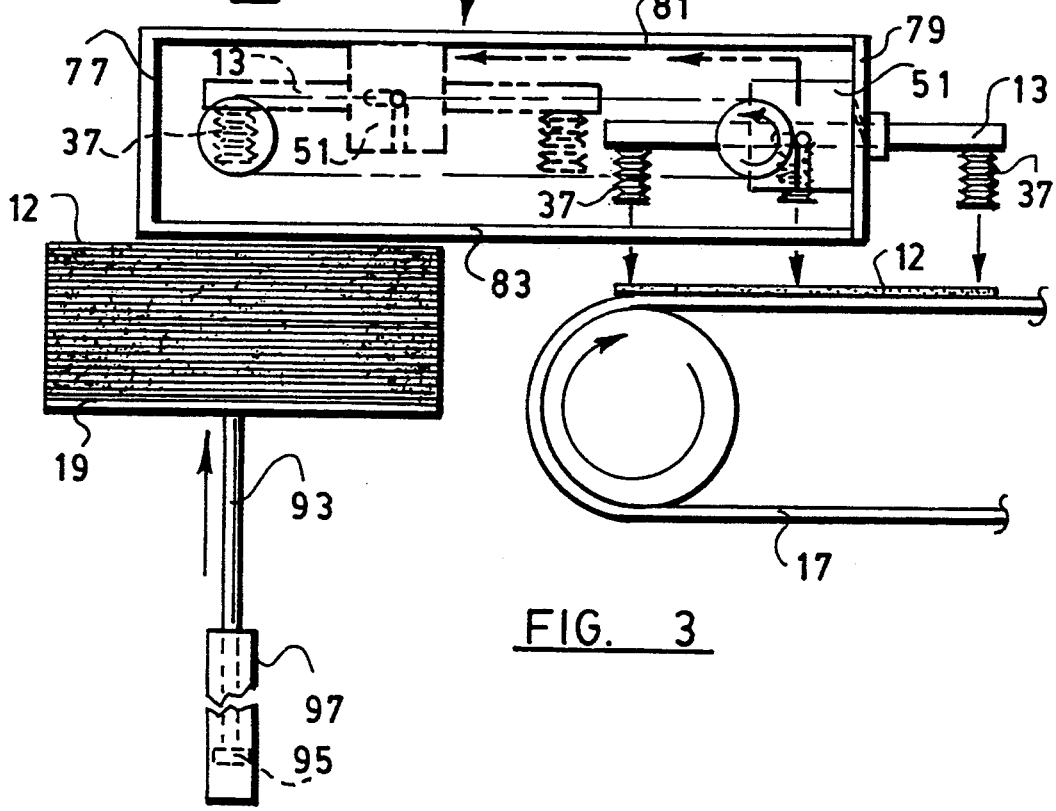

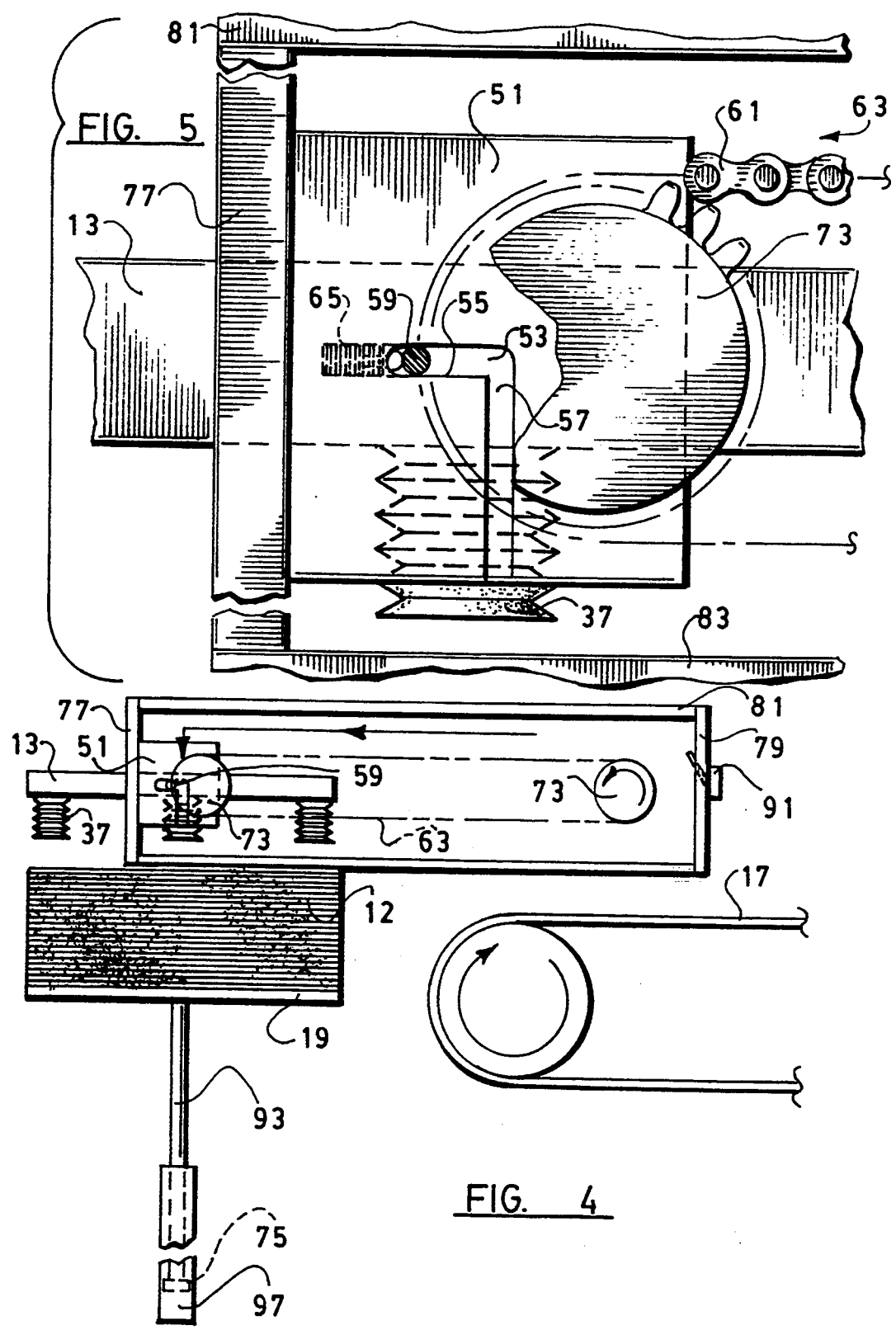

APPARATUS FOR HANDLING THIN, FLEXIBLE SHEETS OF MATERIAL

BACKGROUND OF THE INVENTION

In my U.S. Pat. Nos. 4,913,043, 5,039,295 and 5,161,458, I described and disclosed methods and apparatuses for the continuous manufacture of traditionally shaped foods such as egg rolls, for molding egg roll fillings and for combining the egg roll filling molding function with the continuous manufacturing functions. These continuous manufacturing methods and apparatuses have remained dependent upon the manual placement of the thin, non-rigid sheets of dough, which form the wrapping for the egg roll and other foods, on the conveyor belt of the continuous manufacturing apparatus. Also, the sheet of dough had to be positioned so that a corner of the sheet pointed downstream of the conveyor belt where it could receive the filling and be properly wrapped around the filling. Because of the awkward handling characteristics of these thin sheets of dough, it has been necessary to handle them manually and the manual handling has prevented my methods and apparatuses from being operated at their maximum capabilities in automatically producing traditionally shaped food products.

Therefore, it is an object of this invention to provide an apparatus for mechanically handling a sheet of food material such as a thin, non-rigid dough and feeding it to an automatic food product forming machine.

Accordingly, it is another object of my invention to provide an apparatus for mechanically removing a sheet of dough from a stack of sheets of dough and depositing the removed sheet of dough on a moving surface such as a conveyor belt in a desired orientation so that a food filling may be automatically placed on the sheet of dough and the sheet of dough and food filling may be subsequently mechanically formed into a wrapped food item such as an egg roll.

Another object of this invention is an apparatus that can pick up, carry and deposit a non-rigid piece of material such as a sheet of dough without damaging or distorting the sheet of dough.

Another object of this invention is an apparatus for depositing sheets of dough one at a time in a timed sequence on the feeding mechanism of an egg roll forming machine.

Still another object of this invention is a mechanism that moves a stack of sheets of dough incrementally upwardly towards a mechanism that picks off one sheet of dough at a time from the stack of sheets of dough.

Another object of this invention is an incremental lifting mechanism that uses air under pressure to raise a dough sheet support plate and a hydraulic escapement means to control the upward incremental movement of the dough sheet support plate.

Another object of this invention is a suction pick up apparatus which can lift, hold and deposit material such as a sheet of dough without distorting or damaging the dough.

Other objects may be found in the following specification, claims and drawings.

BRIEF DESCRIPTION OF THE DRAWINGS

FIG. 1 is a perspective view of the thin sheet handling apparatus of this invention with some parts broken away, other parts omitted and still other parts shown in phantom lines or schematically for clarity of illustration;

FIG. 2 is a partial side elevational view of the apparatus of FIG. 1 with the sheet carrier shown in its thin sheet pick-up position and with a lifted position of a thin sheet and a moved position of the sheet carrier shown in phantom lines;

FIG. 3 is a partial side elevational view similar to FIG. 2 but showing the sheet carrier in its thin sheet depositing position and showing a moved position of the carrier in phantom lines;

FIG. 4 is a partial side elevational view similar to FIGS. 2 and 3 but showing the sheet carrier in its position of travel prior to lifting a single thin sheet from a stack of thin sheets;

FIG. 5 is an enlarged, partial, side elevational view of the thin sheet carrier in the position of travel shown in FIG. 4 with some parts broken away and hidden parts shown in dashed lines;

FIG. 6 is an enlarged side elevational view of a thin sheet pick up conduit with a portion of the thin sheet carrier shown in cross-section and a hidden nozzle shown in dashed lines;

FIG. 7 is a perspective view of a thin sheet pick up conduit nozzle;

FIG. 8 is an enlarged, partial, cross-sectional view of a conduit and nozzle picking up a thin sheet which sheet is shown in phantom lines;

FIG. 9 is an enlarged, partial, perspective view showing the attachment of the drive chain to a carrier block.

DESCRIPTION OF THE PREFERRED EMBODIMENTS

Figure 10:
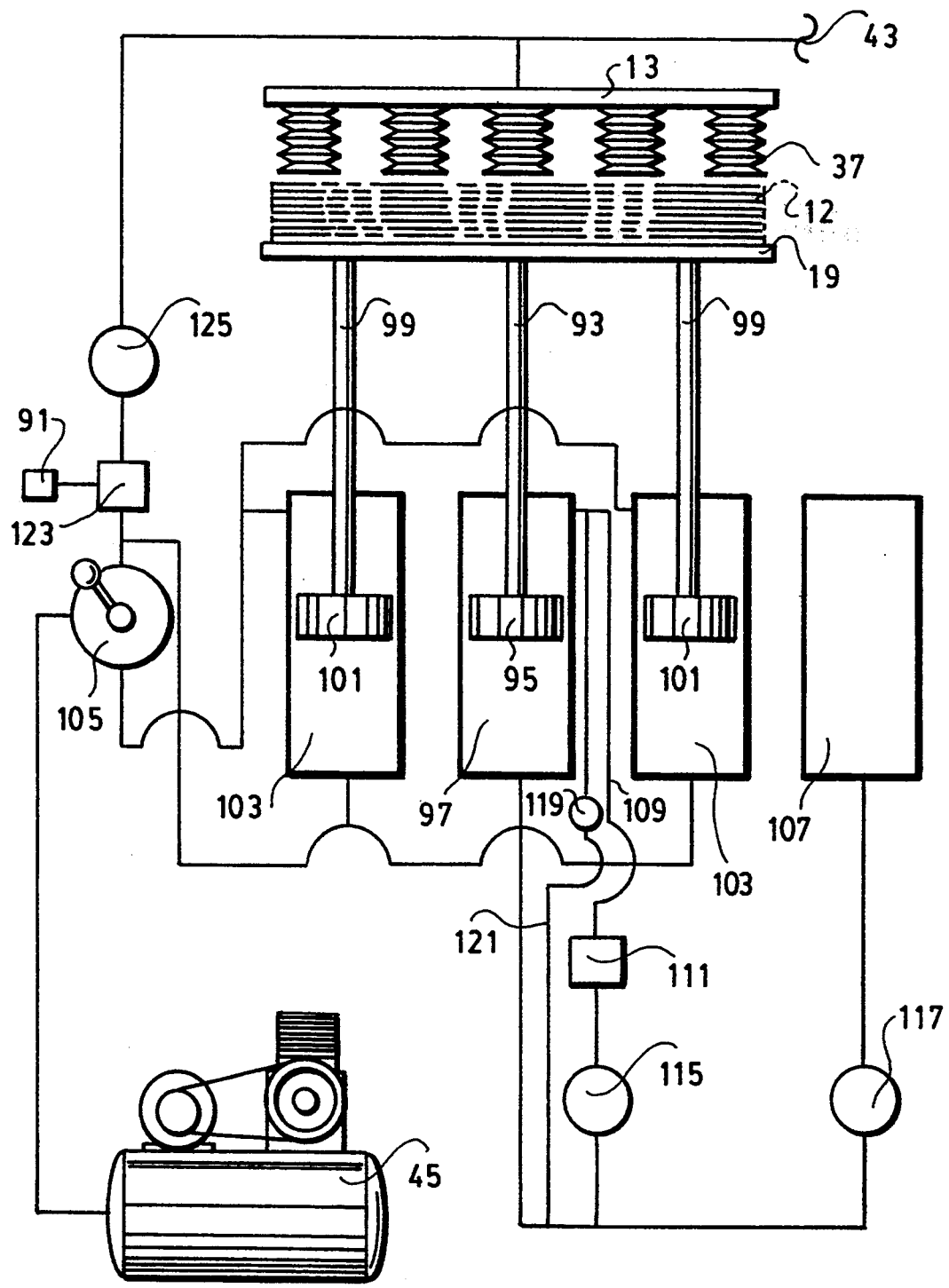
FIG. 10 is a schematic view of the pneumatic and hydraulic systems of the apparatus of this invention.

FIG. 1 of the drawings shows an apparatus 11 for handling thin sheets 12 of limpid, non-rigid materials such as dough. For economy and clarity of explanation, the invention will be shown and described in this specification as applied to the handling of thin sheets of food material such as dough, but it should be understood and appreciated that the apparatus of my invention may be adapted to handle thin sheets of almost any material.

The apparatus 11 includes a flat, somewhat T-shaped carrier 13, means 15 to guide and move the carrier in a closed path which includes the upstream end of a conveyor 17. The conveyor 17 is at the intake end of a food processing machine such as an egg roll wrapping apparatus, which is not shown. The closed path of the movement of the carrier also includes the top surface of a plate 19 which supports the thin, limpid sheets 12 of dough. A means 21 is provided to incrementally lift the plate 19 of sheets 12 of dough towards the carrier 13. The apparatus 11 is shown somewhat schematically in FIG. 1 with additional details shown in other figures of the drawings.

The carrier 13 is flat and T-shaped as shown in FIG. 1 and has a series of connected passages 31 extending therethrough which lead to outlets 33 in the lower face 35 thereof (FIG. 6). Threaded into each outlet 33 is a collapsible bellows-like conduit 37 having a somewhat concave shaped nozzle 39 installed in the lower end thereof with the nozzle having a relatively small diameter circular passage 41 extending therethrough. The details of the conduits 37 and their nozzles 39 are shown in FIGS. 6, 7 and 8 of the drawings.

A square block 51 is mounted on each of the opposite lateral sides of the carrier 13. As shown in detail in FIGS. 5 and 9 of the drawings, an L-shaped slot 53 is formed in the outer surface of each block which faces the carrier 13. The horizontal leg 55 of each slot terminates short of the edge of the block and the vertical leg 57 extends to the edge of the block as shown in FIG. 5 of the drawings. The end of an elongated pin 59 is seated in the slot 53 and the opposite end thereof is connected to a link 61 of a drive chain 63, one of which drive chains is located on each side of the carrier 13. A button-tipped compressed coil spring 65 is seated in the horizontal leg 55 of the L-shaped slot and biases the pin 59 to the intersection of the legs of the slot for reasons to be hereinafter explained. The vertical legs 57 provide ease of installation and removal of the blocks 51 relative to the pins 59.

The drive chains 63 are driven in timed synchronization by means of auxiliary drive chains 67 driven by sprockets 68 located at opposite ends of a shaft 69. The shaft 69 is driven by an electric motor 71 or other drive source such as the conveyor 17. The opposite ends of the drive chains 63 are mounted on sprockets 73. The drive chains 63 move the carrier 13 in a counterclockwise direction as viewed in the drawings, which direction is indicated in some of the drawings by arrows. The drive chains 63 and the blocks 51 move inside rectangular frames 75 located on opposite sides of the carrier 13. The rectangular frames each include vertical end members 77 and 79, a top member 81 and a bottom member 83. The end member 77 of each frame is located over the sheet support plate 19 while the other end member 79 of each frame is located over the conveyor 17. The frames 75 stabilize the carrier 13 as it moves in a closed counterclockwise path driven by the drive chains 63.

In FIG. 1 of the drawings, the carrier 13 is shown moving in a counterclockwise path in the direction of the end members 77 of the frames 75. The carrier is on the upper leg of the drive chains 63 and the pins 59 connecting the blocks 51 to the drive chains are at the intersection of the legs of the L-shaped slot 53 under the bias of the compressed coil springs 65 as shown in detail in FIGS. 2 and 9 of the drawings. As the front portion of carrier 13 passes the end members 77 of the frames 75, its blocks 51 engage the end members 77 of the frames 75 to stop movement of the blocks horizontally as shown in FIGS. 4 and 5. However, the pins 59 continue to move to the left as viewed in FIGS. 4 and 5 under the driving force of the chains 63 as the carrier 13 continues to move vertically downward as viewed in the drawings. The pins 59 compress the coil springs 65 in the manner shown in FIG. 5 allowing the carrier 13 to continue to move downwardly against the end member 77 and the pins 59 to move around with the sprockets 73 and downwardly towards the stack of thin sheets 12 on the support plate 19 while maintaining horizontal stability of the carrier.

The upper position of the carrier 13 and its blocks 51 is shown in phantom lines in FIG. 3 of the drawings and its downwardly moved position after the blocks 51 engage the end members 77 is shown in FIG. 4 of the drawings. The carrier 13 continues to move under the influence of the drive chains 63 vertically downward to the position shown in solid lines in FIG. 2 in which the conduits 37 on the carrier engage the top sheet 12 of the stacks of thin sheets on the support plate 19.

A vacuum source 43, connected to the passages 31 of the carrier 13 and communicating with the conduits 37 causes the conduits to pick up the uppermost thin sheet 12 of material from the stack of thin sheets. The closing of the passages 41 in the nozzles 39 at the lower ends of the conduits by engagement with the sheet 12 of dough causes the conduits 37 to collapse slightly because of the continuing vacuum. Due to the bellows shaped construction of the conduits, they collapse slightly to lift the sheet 12 to the phantom position shown in the left of FIG. 2 where the picked-up sheet 12 clears the sheets 12 still remaining on the stack of sheets on the plate 19.

The carrier then moves to the position shown on the right hand side of FIG. 2 in phantom lines where it approaches the conveyor 17. The conduits 37 have completely collapsed due to vacuum pulling the sheet 12 against the passages 41 in the nozzles 39 and closing the passages. As the carrier 13 continues to move to the right, to the position shown in solid lines in FIG. 3, one of its blocks 51 engages a limit switch 91 mounted on one of the end members 79 causing pressurized air to be introduced into the interconnected passages 31 of the carrier. The pressurized air overcomes the vacuum and exhausts through the passages 41 in the nozzles 39 to discharge the lifted and suspended thin sheet 12 onto the conveyor 17. The carrier then returns to the position shown on the left in phantom lines in FIG. 3 to continue movement in its closed path.

The means for presenting sheets 12 one at a time to the carrier 13 for pick up is shown somewhat graphically in FIG. 1 and schematically in FIG. 10 of the drawings. The plate 19 is mounted on piston rod 93 which connects to a piston 95 in a hydraulic cylinder 97. The plate 19 is also connected to piston rods 99 which connect to pistons 101 in pneumatic cylinders 103. Since the three piston rods 93 and 99 are rigidly connected to the plate 19, they move in unison. The air compressor 45 supplies air under pressure through a 3-way control valve 105 to the undersides of the pistons 101 in the pneumatic cylinders 103 to force the plate 19 upwardly.

The hydraulic cylinder 97 has entrapped hydraulic fluid on both sides of its piston 95 which prevents movement of the plate 19 against the forces exerted by compressed air against the undersides of the pneumatic pistons 101. A hydraulic reservoir 107 is connected to the hydraulic cylinder 97 by a conduit 109 forming a closed circuit for the hydraulic fluid. A solenoid valve 111 controls the flow of hydraulic fluid from the hydraulic cylinder 97 on the upper side of its piston 95 to the hydraulic reservoir 107. The solenoid valve 111 is controlled by a sensor 112 shown in FIG. 1 which senses the height of the top thin sheet 12 carried by the plate 19. When the top sheet 12 on the plate 19 is below the position shown in FIG. 2, the sensor 112 opens solenoid valve 111 and allows hydraulic fluid to flow out of the hydraulic cylinder 97 on the upper side of the piston 95 through an adjustable flow regulator valve 115 to the reservoir 107. The intermittent opening of the solenoid valve 111 under the control of the sensor 112 allows incremental raising of the plate 19 and the sheets 12 carried by the plate because the sensor 112 has a detection sensitivity of 4 mm with a normal closed circuit.

The hydraulic conduit 109 also has a second adjustable flow control valve 117 which allows a measured rate of flow into the reservoir 107 and full flow out of the reservoir to return to the lower portion of the hydraulic cylinder 97 under the piston 95. A check valve 119 is provided in a bypass conduit 121 between the upper side of the hydraulic piston 95 and its lower side. The check valve 119 permits unrestricted flow of hydraulic fluid from the lower side of the piston 95 to the upper side when the plate 19 is being lowered.

The limit switch 91 controls flow of air under pressure to the carrier 13 through a solenoid valve 123 connected to the three way control valve 105 as shown in FIG. 10. An adjustable flow regulator valve 125 is located between the solenoid valve 123 and the carrier 13. When the limit switch 91 is actuated, the solenoid 123 is opened allowing air under pressure into the carrier 13 and conduits 37 to override the vacuum and to force the release of the thin sheet of material which is being held by the closed nozzles 39 of the collapsed conduits 37.

I claim:

1. A mechanism for supplying sheets of dough, one at a time, from a stack of sheets of dough to a carrier for lifting a single sheet of dough, carrying said removed single sheet of dough a distance away from said stack of sheets of dough and depositing said removed sheet of dough at a location remote from said stack of sheets of dough, said mechanism including:

a plate for supporting a stack of sheets of dough, a first piston rod extending downwardly from said plate and connected to a piston in a hydraulic cylinder, a second piston rod extending downwardly from said plate and connected to a piston in a pneumatic cylinder, a source of air under pressure, means connecting said source of air under pressure to said pneumatic cylinder to raise said pneumatic piston and said second piston rod, a source of hydraulic fluid in said hydraulic cylinder on opposite sides of said piston, means to release a measured amount of hydraulic fluid from one side of said hydraulic piston to permit said plate to be lifted by said pneumatic piston.

2. The mechanism of claim 1 including means to sense the location of the top sheet of dough on said stack of sheets and to signal said means to release a measured amount of hydraulic fluid from one side of said hydraulic piston when said top sheet of dough is removed.

* * * * *